US009550210B2

(12) United States Patent
Leiden et al.

(10) Patent No.: US 9,550,210 B2
(45) Date of Patent: Jan. 24, 2017

(54) METHOD OF COATING PIPES OR PIPE SECTIONS

(75) Inventors: Leif Leiden, Porvoo (FI); Jouni Purmonen, Porvoo (FI); Sven Sjoberg, Vasa (FI)

(73) Assignees: BOREALIS AG, Vienna (AT); UPONOR INFRA OY, Vantaa (FI)

( * ) Notice: Subject to any disclaimer, the term of this patent is extended or adjusted under 35 U.S.C. 154(b) by 0 days.

(21) Appl. No.: 13/496,795

(22) PCT Filed: Sep. 16, 2010

(86) PCT No.: PCT/FI2010/050713
§ 371 (c)(1),
(2), (4) Date: May 29, 2012

(87) PCT Pub. No.: WO2011/033175
PCT Pub. Date: Mar. 24, 2011

(65) Prior Publication Data
US 2012/0231160 A1    Sep. 13, 2012

(30) Foreign Application Priority Data
Sep. 17, 2009  (EP) .................... 09170530

(51) Int. Cl.
*B05D 3/02*       (2006.01)
*B05D 7/14*       (2006.01)
(Continued)

(52) U.S. Cl.
CPC ............. *B05D 7/148* (2013.01); *B05D 1/38* (2013.01); *B05D 3/02* (2013.01); *F16L 58/181* (2013.01);
(Continued)

(58) Field of Classification Search
CPC .... F16L 58/1027; F16L 13/0272; F16L 9/121; F16L 58/1054; B05D 2401/32; B05D 7/222; C23C 10/52
(Continued)

(56) References Cited

U.S. PATENT DOCUMENTS 3,868,265 A * 2/1975 Sakai et al. .................... 264/279
4,048,355 A * 9/1977 Sakayori et al. ............. 427/375
(Continued)

FOREIGN PATENT DOCUMENTS

DE     32 30 955 A1    2/1984
EP        0366168    *  9/1989
(Continued)

OTHER PUBLICATIONS

European Search Report of EP 09 17 0530 dated Feb. 11, 2010.
International Search Report of PCT/FI2010/050713 dated Feb. 4, 2011.

Primary Examiner — Alexander Weddle
(74) Attorney, Agent, or Firm — Sughrue Mion, PLLC

(57) ABSTRACT

The present publication discloses a method for coating pipes. The method comprises applying curable first polymer (e.g. epoxy) onto the surface of the pipe and partially curing the first polymer or leaving the first polymer uncured to in order to form a reactive first polymer layer. Thereafter, the pipe with the reactive first polymer layer is heated and a second polymer (e.g. polyolefin) is applied directly onto the heated reactive first polymer layer, whereby the two polymers react and form a protective coating on the pipe or pipe section. In particular, the heating can be carried out in two steps such that the first polymer stays reactive until the application of the second polymer.

24 Claims, 4 Drawing Sheets

(51) Int. Cl.
   *B05D 1/38*          (2006.01)
   *F16L 58/18*         (2006.01)
(52) U.S. Cl.
   CPC ........... *B05D 3/0218* (2013.01); *B05D 3/0254* (2013.01); *B05D 7/14* (2013.01); *B05D 2202/10* (2013.01); *B05D 2254/02* (2013.01)
(58) Field of Classification Search
   USPC .... 427/203, 340, 318, 379, 402, 409, 372.2, 427/389, 386
   See application file for complete search history.

(56) References Cited

U.S. PATENT DOCUMENTS

| | | | | |
|---|---|---|---|---|
| 4,213,486 | A | * | 7/1980 | Samour et al. ............... 138/143 |
| 4,510,007 | A | * | 4/1985 | Stucke .................... 156/244.12 |
| 5,026,451 | A | * | 6/1991 | Trzecieski et al. ...... 156/244.27 |
| 5,792,518 | A | | 8/1998 | Gibson et al. |
| 2003/0055142 | A1 | * | 3/2003 | Steckel ........................ 524/308 |
| 2010/0133324 | A1 | | 6/2010 | Leiden et al. |

FOREIGN PATENT DOCUMENTS

| | | | |
|---|---|---|---|
| EP | 0366168 | * | 5/1990 |
| EP | 1 985 909 A1 | | 10/2008 |
| GB | 2 233 253 A | | 1/1991 |
| WO | 9012657 | * | 4/1990 |
| WO | 90/12657 | * | 11/1990 |
| WO | 95/33579 A1 | | 12/1995 |
| WO | 2008071773 | * | 12/2007 |
| WO | 2007/001773 | * | 6/2008 |

* cited by examiner

METHOD OF COATING PIPES OR PIPE SECTIONS

CROSS REFERENCE TO RELATED APPLICATIONS

This application is a National Stage of International Application No. PCT/FI2010/050713 filed Sep. 16, 2010, claiming priority based on European Patent Application No. 09170530.1 filed Sep. 17, 2009, the contents of all of which are incorporated herein by reference in their entirety.

BACKGROUND OF THE INVENTION

Field of the Invention

The present invention concerns a method for coating a pipe or a pipe section. In particular, the invention concerns coating steel pipes and field-joints of steel pipes. In the method, the pipe or pipe section is provided with a polymer coating for protecting the pipe or pipe section and in particular pipe joints. The polymer material is generally applied on the surface of the pipe or pipe section along at least a part of the periphery thereof.

Description of Related Art

Steel pipes coated with layers of polymers, such as polyethylene or polypropylene, have been used in oil and gas pipelines for a long time. These kinds of pipes are mechanically strong and have good corrosion resistance along the coated part of the pipe. They are generally welded together using the SAW technique (Submerged Arc Welding) to form a pipeline. To facilitate weld-joining of the pipes at the construction site, end portions of the pipe are usually left without coating at the factory. In practice, the pipes are often coated entirely and in a later stage the polymers are stripped or brushed off at the ends of the pipe. This is called cut-back area and the length is defined through the project specification, normally 150 mm on both pipe ends.

Field-welded pipe joints, i.e. girth welds formed at the construction sites, are sensitive to corrosion. For this reason, a coating layer has to be spread upon the girth weld and on the adjacent, uncoated portions of the pipes so as to completely cover the welded joint and to shield it from moisture and water in the ambience. Thus, the applied polymer layer overlaps with a factory coating of the pipes joined.

Field-joint coatings are conventionally most typically produced by injection moulding or by surface fused tape techniques. Also a number of other techniques such as epoxy-coating, PUR-coating, and coating by vulcanized tapes or shrinkable sleeves have been utilized. WO 2008/132279 discloses another method and apparatus for coating field-welded joints by applying polymer material in the form of a melt film or sheet on the surface of the pipe or pipe section from a moving die or nozzle. WO 01/32316 discloses another pipe coating apparatus for coating girth welds of pipelines, which is equipped with spray coating means.

For achieving a durable coating on the pipe, it is essential that the applied polymer layer is strong, internally of high quality and effectively bonded to the pipe. A vast number of different protective coating solutions (according to the field-joint coating standard ISO 21809-3) are considered durable in terms of sufficient protection. Powder epoxy is today used widely either as stand alone or together with a polyolefin coating. In such a case the steel pipe is heated up to desired application temperature normally using inductive heating, and the desired polymers are applied on to the surface. In one common method, the steel pipe is heated to 180-250° C. and powder epoxy is applied, fused and through cured onto the pipe.

A technique involving the combined use of epoxy powder and polyolefin has the potential to provide very durable and tight coatings. However, prior practical implementations of the technique suffer from certain disadvantages. This is because the conventionally used a steel temperature, higher than about 180° C., results in through curing of the epoxy in a short time. Thus, there needs to be an intermediate adhesive layer, e.g. polyolefin powder, application stage before the final topcoat is applied for achieving sufficient adhesion of the layers. Such approach is presented in EP 1316598, which discloses a method where an adhesive blend composition and a polyethylenic outer layer are coextruded on a through-cured epoxy layer, thus forming a three-layer final structure. However, in all these situations, the application method is unnecessarily complicated.

Thus, there is a need for improved pipe coating methods.

SUMMARY OF THE INVENTION

It is an aim of the invention to achieve a coating method by which protective pipe coatings can be achieved in a convenient way. In particular the aim is to achieve a method, which is simpler than and not as time critical as known methods.

A secondary aim is to achieve increased protection against corrosion and mechanical damages.

The invention is based on the observation that a coating with good adhesion to the substrate can be achieved in a simple manner by utilizing a curable precoat layer and a protective primary coating layer added thereon while that precoat layer is still is reactive state. In particular, the heating can be carried out in two steps such that the first polymer stays reactive until the application of the second polymer.

For example, when epoxy powder is applied to a heated pipe, the epoxy powder melts and provided that the epoxy is let to only partially cure on the pipe surface, it forms a solid but still reactive layer on the pipe surface. When additional heating is applied and another reactive polymer is applied on top of the reactive epoxy layer, for example by melt film technique, one will achieve tight bonding of the coating to the pipe and excellent chemical bonds between the two polymers and a through curing of the epoxy. In addition to epoxies, similar behavior may be observed with other curable polymer precoats. Thus, the method according to the invention comprises providing first curable polymer onto the surface of the pipe, partially curing the first curable polymer or leaving the curable polymer uncured to in order to form a reactive first polymer layer, heating the pipe or pipe section with the reactive first polymer layer, providing second polymer on the heated reactive first polymer layer, whereby the two polymers react and form a multilayer coat on the pipe or pipe section.

As the pipe cools, a well-coated pipe or pipe section is obtained. It is to be noted, that the second polymer is provided directly on the reactive epoxy layer, without any intermediate layers or adhesives. The second polymer preferably forms the topcoat of the pipe, whereby the total number of polymer layers is two.

More specifically, the method according to the invention is defined in claim 1.

The invention offers significant advantages. In addition to forming a mechanically and chemically stable coating for the pipe, it makes the application process more straightforward as compared with prior techniques. This is because the first layer is at least partly uncured and thus reactive at the time of application of the second polymer, no separate step application of adhesives is required between the layers of the coating. The bonding of the layer takes place through direct polymer-polymer interaction of the layers. In addition, as the final heating required for through curing takes place only at the time of application of the second polymer layer, damages on a factory coating of the pipe typically present in industrial steel pipes, can be reduced or avoided.

One main advantage of the invention is that the coating process remains very flexible, as the temporal processing window is wide. The time between epoxy application and adhesive application (ICT, Inter Coating Time) is measured in seconds using conventional coating methods. The present invention allows for pre-heating of the pipe and application of the epoxy and then, after a considerably longer period, re-heating the pipe and partially cured epoxy and application the reactive polyolefin on top. Thus, the present method is free from inconveniently time critical processing stages.

For the above reasons, the present coating method is very suitable for field conditions, in which the number of coating steps and different materials should be kept as low as possible and in which the requirements for durability of the coating are very high. In addition, the girth welds produced between individual pipe units in field conditions require good protection against corrosion which is achievable by the present method. Thus, the invention is suitable to be used for manufacturing terrestrial or submarine pipelines for long-distance transportation of fluids, in particular gases and liquids.

According to a preferred embodiment, the first polymer is thermosetting. In particular, the first polymer can be epoxy or other copolymer comprising a basic part and hardener part. According to a particularly advantageous embodiment, the epoxy is applied in powder form, the powder having a gel time long enough for only partial curing to take place by the heat of the pipe within the period between application of the individual layers. In such powders, the hardener is of a slowly crosslinking type.

According to one embodiment, before providing first curable polymer onto the surface of the pipe, the pipe or pipe section is heated to a temperature above the melting point of the first curable polymer. In this embodiment, the curable polymer, such as epoxy, is preferably applied in powder form onto the heated pipe or pipe section, whereby it melts. The polymer is thereafter partially cured in order to form a solid but still reactive layer.

According to a preferred embodiment, for applying the first polymer, the pipe or pipe section is heated to a first temperature, and for applying the second polymer, the pipe or pipe section is heated to a second temperature higher than the first temperature. This approach has particular advantages. In particular when coating field joints using the polyolefin melt film technique (for the primary protective layer), heat is needed for curing the underlying epoxy layer, and welding of the coating to a factory coating of the pipe. The heat to the steel shall be applied in the process according to this embodiment in two steps, and thus more gently than in prior one-step heating processes, in order to slowly heat up the surface of the factory coating close to its respective melting temperature. Thus, blistering of the factory coating is avoided. Heat from the steel through the factory coating takes time and a heavy one step heating would cure the epoxy too soon, i.e. before the polyolefin application. In addition, the heat would not reach the surface of the factory coating for a good welding bond at the bevel of the factory coating and overlap zone of the coatings. A two-step heating, in the first stage to for example 110-170° C., preferably 140-160° C., gives the required time for heat to go through factory coating as the second heating step to for example 170-200° C. takes place typically 30 seconds to 30 minutes, in particular 30 seconds to 5 minutes later. The polyolefin application operation in the second step and additional heating cures the epoxy thoroughly and forms good welding to the factory coating.

In addition, by using the two step heating process in which the precoat and topcoat are let to react with each other to form a tight bond, also a separate polyolefin adhesive powder application can be avoided. This cannot be avoided in a one step heating as the epoxy would be through-cured too quickly and no chemical bonds between the epoxy and the top coat could form.

As mentioned above, according to one embodiment, the first polymer is added onto the heated pipe in powder form. As the powder contacts the heated pipe, it melts and forms a layer onto the surface of the pipe. The powder can be applied by spraying, for example. After layer formation, the epoxy is partially cured. It must, however be ensured that the polymer stays reactive. This means that it is capable of reacting with the second polymer once heated in the second heating step of the process. Provided that the temperature of the pipe during application of powder epoxy is low enough, that is, usually less than 160° C., only partial curing takes place and the reactivity of the epoxy stays for at least 30 seconds, typically up to 30 minutes. This timeframe is sufficiently long for the second polymer to be applied.

In an alternative embodiment, the first polymer is applied in liquid form. The first polymer can in this case be one or two component epoxy. In this case, the polymer can be added to an unheated or only slightly heated pipe and its period of reactivity can be prolonged to several hours and even to several days. When the pipe is heated for applying the second polymer layer, the temperature of the first polymer layer rises too and the first polymer layer forms a reactive underlying for the second polymer layer and cures.

According to a preferred embodiment, the second polymer is thermoplastic. In particular, the second polymer may be a polyolefin, such as maleic acid grafted polyethylene or polypropylene. The second polymer layer is preferably a unitary layer, consisting of single polymer or a homogeneous blend of polymers.

According to one embodiment, the second polymer is applied onto the heated pipe in molten form, for example by the melt film application method disclosed in WO 2008/132279. Alternatively, the second polymer can be provided in solid form, whereby the heat of the pipe melts the polymer at least on the interface of the two polymer layers, ensuring that the two polymers react.

In particular curable epoxy resins have been found, when left in a reactive state, to form an excellent bond with polyolefins, which are also reactive. The reaction between the layers can be initiated with the additional heating step at the time and/or before application of the second layer.

The terms "reactive (first polymer) layer" and "partial curing (of the first polymer layer)" are interlinked in the sense that a partially cured layer is not completely cross-linked and is still reactive within the meaning of the invention. The determination of the degree of crosslinking is based on differential scanning calorimetry (DSC) analysis by which the glass transition temperature $T_g$ of the material can be determined. If $T_g$ deviates by at least 3° C. from a literature value for that polymer (i.e. $\Delta T_g > 3°$ C.), the layer is still reactive. Literature values can be obtained e.g. from Brandrup, J.; Immergut, E. H.; Grulke, E. A. (1999). *Polymer Handbook* (4 ed.). Wiley-Interscience.

Both curing temperature and curing time influence the degree of crosslinking. The abovementioned condition is generally well met at the gel time (ISO 8130-6) of the epoxy used at the gel time measurement temperature and even after longer periods if a lower temperature is used. The significant curing time herein is the time from application of the polymer on the pre-heated pipe to the application of the second polymer layer. The degree of curing is proportional to the time integral over this period of temperature. Thus, as the source of energy for curing is primarily the heat of the pipe, the decrease of temperature during this period must be taken into account, if the temperature is not actively maintained at a constant value during this period, as the case usually is. Also, if the temperature of the pipe is elevated again significantly before the application of the second layer, the increased temperature must be taken into account.

The invention provides significant advantages. In particular, excellent protection against corrosion and mechanical damages of the pipe surface can be achieved.

DETAILED DESCRIPTION OF PREFERRED EMBODIMENTS

As described above, in the present method the coating is preferably provided onto the pipe by a two-step heating process. In the first heating step, the steel pipe is heated so that the epoxy fuses but does not cure completely, maintaining its reactivity. In the second step, the epoxy is heated to a higher temperature, which means that the only partially cured epoxy fuses again and then cures to the end together with our reactive top-coat.

Figure 1:
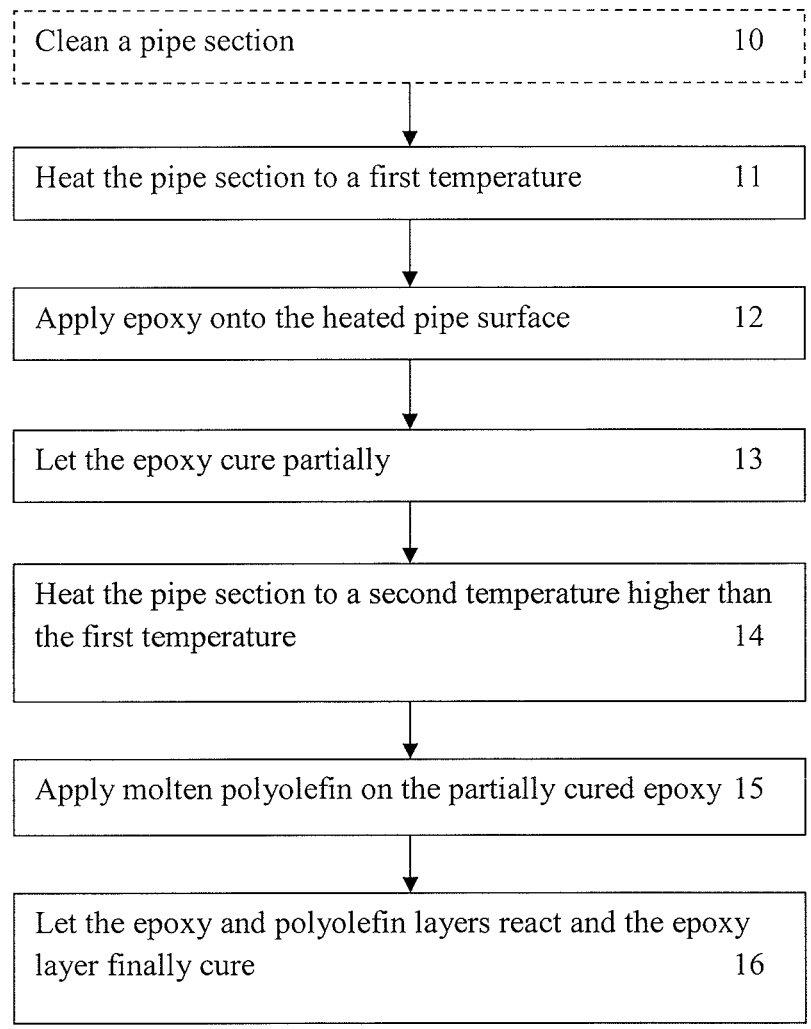
FIG. 1 shows schematically the process according to one embodiment of the invention.

FIG. 1 shows as a flow chart the coating process according to one embodiment. In an optional preparatory step 10, the pipe is cleaned at the area where the coating is to be added to. The purpose of cleaning is to increase the adhesion of the epoxy layer to the pipe. In particular, when coating field-welded joints, cleaning is a preferred step as the girth weld may contain impurities. In step 11, the area of the pipe to be coated is heated to a first temperature, which is chosen to provide energy to the epoxy layer sufficient to only partially cure the epoxy layer at the planned time between the first and second coating steps (steps 12 and 15). In step 12, epoxy powder is applied onto the heated surface, whereby the epoxy powder forms a uniform layer and partially cures in step 13. In step 14, the pipe which has cooled down to at least some extent, is re-heated to a temperature, which is higher, typically 10-60° C. higher, than the first temperature. Upon re-heating, the curing of the epoxy in continued, but before the curing process is complete, the polyolefin layer is applied in step 15. The still reactive epoxy layer and the polyolefin layer bond firmly together in step 16. Finally, the coated pipe is cooled down to ambient temperature.

As mentioned above, after partial curing, a significant portion of individual crosslinks in the polymer are still unproduced, thus leaving the layer reactive with the following polymer layer. According to one embodiment, the proportion of unproduced crosslinks is at least 10%, in particular at least 25%. In other words, the reaction ratio of the curing process is less than 90%, in particular less than 75%.

The first polymer layer is preferably an epoxy layer formed from powder-form epoxy. The epoxy powder can be sprayed onto a pre-heated steel pipe. Heating at least to 110° C. is typically necessary for initiating the melting and curing process. However, heating above 170° C. has generally been found to cure the epoxy too fast. The gel time of the epoxy powder is preferably at least 30 s, in particular 45-150 s, when measured according to ISO 8130-6. The total curing time is typically several times the gel time at a given temperature. Thus, the epoxy is "slow" enough for the partial curing process. Such slow epoxies are available in the phenol epoxy group. Suitable epoxies can be found, for example, in the INFRALIT product family, supplied by TEKNOS, Finland.

If powder-form epoxy is used, the temperature may be further elevated and the second polymer may be applied after film formation of the epoxy, for example 0.5-60 minutes, in particular 0.5-5 minutes later. Due to the lowered epoxy application temperature, the second coating step is made before full curing of the epoxy takes place in the presence of the heat of the pipe, which in practice means before the expiry of five, preferably two times the gel time of the epoxy measured from the start of epoxy application. Within such time frame a good chemical bond is achieved between the two polymers.

The thickness of the epoxy layer formed typically varies between 50 to 400 μm.

For applying the powder epoxy, electrostatic coating principle can be utilized, as known in the art. This means that the powder particles and the pipe may be electrically charged for facilitating the adherence of the particles to the area of the pipe to be coated. Thus, waste of powder is decreased.

Powder epoxy has the benefit of being sprayable in practically all ambient temperatures, even in degrees of frost, which is of importance in field conditions.

Alternatively, the first polymer layer can be formed from liquid two component epoxy by spraying, for example. In this case, the epoxy application can be made on an unheated or only slightly heated pipe (e.g. 20-110° C.). Consequently, also the application window for the second polymer is longer in this case. The second polymer may be applied for example 0.5 minutes to 30 days, in particular 0.5 minutes to 24 hours later.

Figure 2:
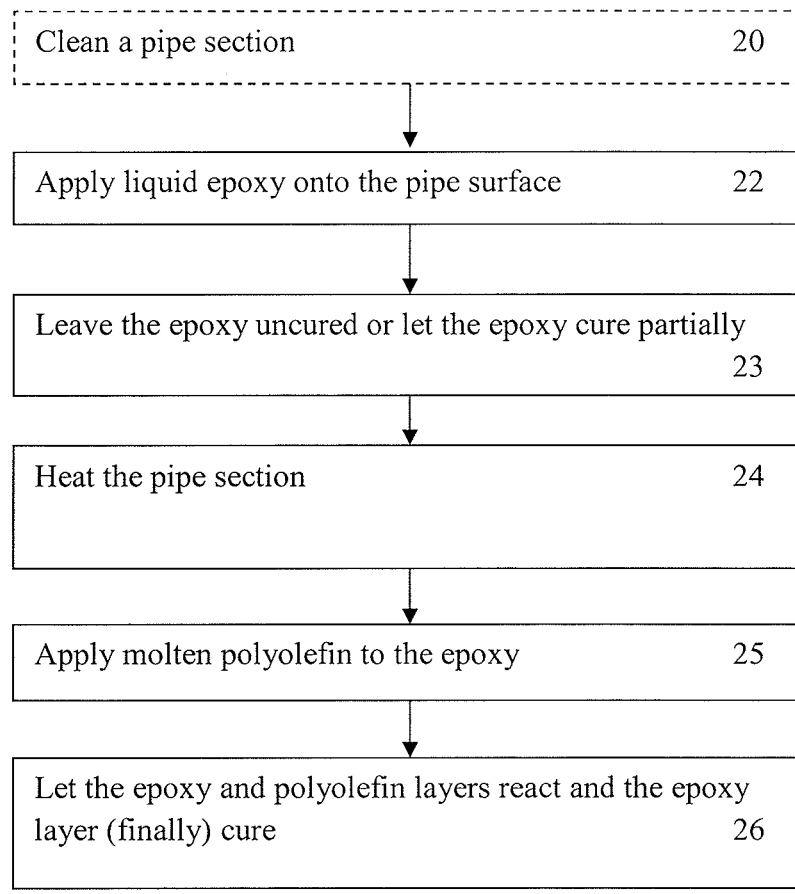
FIG. 2 shows schematically the process according to one embodiment of the invention.

FIG. 2 shows a flow diagram of the process when liquid epoxy is used, including an optional pipe cleaning step 20, epoxy application step 22, optional curing in step 23, heating step 24, polyolefin application step 25, and final curing and reacting step 26. Noteworthy is, that liquid epoxy can be applied to even unheated pipe surfaces, as they are able to directly form a film required for the polyolefin to be applied. In an alternative embodiment, the pipe is heated also before application of the liquid-form epoxy, but the intensity of heating can be, but needs not be, considerably lower than when powder form epoxy is used. Also liquid epoxy can be applied by spraying.

The second polymer may be a polyolefin, typically PE (polyethylene) or PP (Polypropylene) or a blend thereof, in reactive form. For these polymers, the present two-step heating scheme, utilizing a partially cured long gel time epoxy resin precoat, is particularly advantageous, as the application window would otherwise be very short making the use of adhesives practically unavoidable. The reactive polyolefin may be a modified polyolefin, containing one or more functional groups. The functional groups may be selected from the group of O, N, Si, S and P or polar groups such as acrylates (e.g. methylacrylates, methylmethacrylates, propylacrylates, butylacrylates), carboxylic acids (e.g. maleic acid) and amines. Suitable exemplary modified polyolefin compositions and methods of production thereof are also given in detail in our earlier international patent application publication WO 2008/132279 and its sub-references, in particular EP 1859926, the relevant contents of which are incorporated herein by reference.

As mentioned above, the second polymer is preferably applied in molten form as a pre-shaped film. This can be made through a flat die or some other kind of extruder connected to a supply of polyolefin mass. The temperature of the pipe should generally be raised to at least 170° C. for ensuring proper reaction of the epoxy and the polyolefin and final curing of the epoxy. Also bonding of the polyolefin to factory coating of the pipe required such temperature. However, to ensure sufficient reaction time, it is preferred to keep the temperature below 200° C. The bonding process can further be enhanced by applying a pressure onto the coating after application of the second polymer layer by suitable levelling means.

The pipe can be heated by any suitable means known in the art, including in particular inductive heating.

Figure 3:
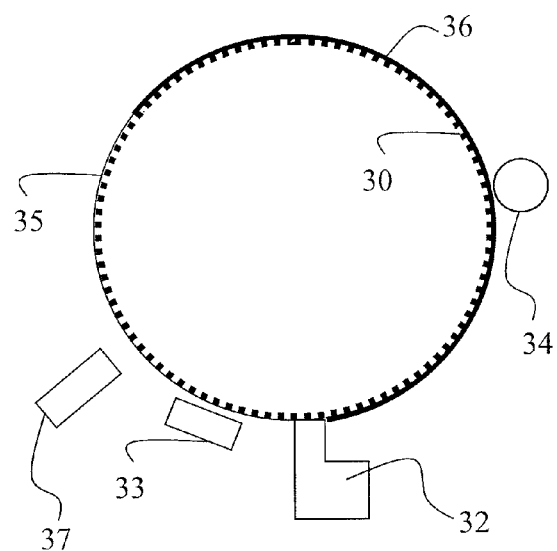
FIG. 3 shows schematically components of an exemplary polyolefin melt film application apparatus according to one embodiment.

For applying both or either one of the polymer layers and, preferably for heating the pipe, an automated apparatus can be used. As concerns a more detailed basic structure of such apparatus, and operation thereof, we refer to WO 2008/132279. The apparatus is designed for applying the polyolefin layer in molten form. Basic components of such apparatus are illustrated also in FIG. 3. The apparatus comprises movable carriage (not shown in FIG. 1), which is capable of travelling around the periphery of the pipe or pipe section 30;

polyolefin application means 32, such as a die, connected to a source of a polymer melt (not shown) for forming a polymer film; and a levelling means 34 capable of levelling and smoothening the polymer film against the outer surface of the pipe or pipe section 30.

To suit the purposes of the present invention, there may be included also heating means 33 on one side of the die 32 and epoxy application means 37 further on the other side of the heating means 33. All the abovementioned means 32, 33, 34 and 37 are preferably mounted on the movable carriage. Thus, when rotating the carriage in one direction, the heating means 33 travels before the epoxy application means 37 for applying the epoxy layer 35 and when rotating the carriage in the other direction, the heating means 33 travels before the polyolefin application means 32 for applying the polyolefin layer 36.

In practice, the coating process together with optional preparatory and finishing steps for a field joint of steel pipe units can be carried out as follows:

1. Pre-heating of steel, for example by using a gas torch, at the region to be coated. The temperature of the steel should preferably be raised high enough to remain at least 3° C. above dew temperature after the following blasting operation (see step 2).
2. Grit blasting the steel to a level of cleanliness Sa 2.5 minimum.
3. Dust removal, for example using compressed air and isopropanol wetted cloth, from blasted steel and factory coating bevel and overlap area.
4. Assembly of plastic film, preventing epoxy from messing up the factory coating and coating bevel.
5. Fastening a coating robot to the pipe. The robot is preferably equipped with an inductive heating unit and application means for the epoxy and/or polyolefin layers.
6. Rotating the robot around the pipe counterclockwise and at the same time heating the steel to approximately 140-160° C. Heating is immediately followed by powder epoxy spray application manually or automatically.
7. Rotating the robot around the pipe clockwise and heating the steel to approximately 170-190° C. Heating is immediately followed by application of polyolefin through a flat die. A pressure roller is preferably used to make sure the plastic is tightly pressed against the pipe.
8. Stopping rotation after sufficient overlap with layer start region or when a desired layer thickness is achieved.
9. Dismounting the robot from the pipe (for e.g. refilling and moving to next joint).
10. Quality control of the coated joint.

Peel-strength tests at 20° C. and at 80° C. have shown that a coating produced on a steel pipe using the above-described method fulfills the strength requirements for factory coatings, not to mention field joint coatings.

As a result of the above process, there is provided a coated steel pipe or pipe section comprising a thin (e.g. 50-300 μm) precoat of cured epoxy and a polyolefin topcoat tightly bonded to the epoxy. Between the layers, there is an intermediate zone in which the polymers have chemically reacted with each other. In particular, there is provided a coated field-welded pipe joint in which the field-applied coating tightly adheres both to the pipe body and to the factory coatings of the pipes joined.

Figure 4A:
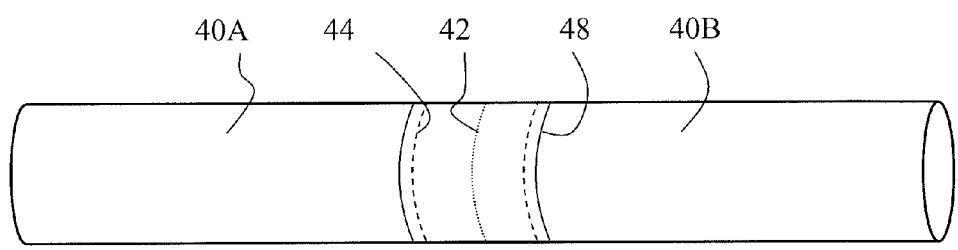
FIG. 4A illustrates in a perspective view a two pipe units welded together and a coating applied on the weld area.
Figure 4B:
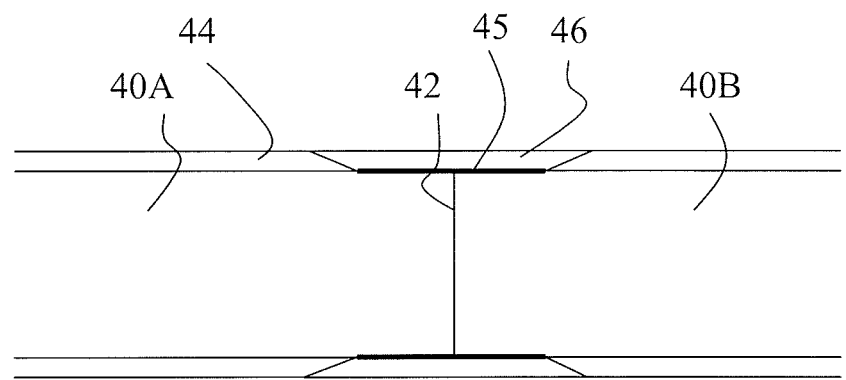
FIG. 4B shows in detail a coated field joint according to one embodiment.

FIGS. 4A and 4B show a pipe having provided thereon a weld seam 42 between two pipe units 40A, 40B. The pipe units are provided with beveled factory coatings 44, which extend into the vicinity of the weld seam 42 leaving a section of pipe body blank nearby the weld seam 42. Onto the blank section, there are provided a precoating layer 45 and topcoating layer 46 such that at least the topcoating layer 46 overlaps with the beveled area of the factory coatings 44.

The above embodiments, examples and attached figures are non-limiting and given in illustrative purposes only. The scope of the invention is to be interpreted in the full scope of the following claims, taking equivalents into account.

The invention claimed is:

1. A method for coating a field joint between two pipe units, comprising:
heating the pipe units to a first temperature, and then applying a curable first polymer onto a surface of the pipe units,
partially curing the first polymer to form a reactive first polymer layer on the surface of the pipe units,
heating the pipe units with the reactive first polymer layer thereon to a second temperature to form a heated reactive first polymer layer, the second temperature being higher than the first temperature, and applying a second polymer to form a second polymer layer directly onto the heated reactive first polymer layer, whereby the first and second polymers react and form a protective coating on the pipe units, wherein the first polymer comprises an epoxy powder, and the second polymer is a reactive polyolefin;

the pipe units to be coated comprise a polymeric factory coating on at least a portion thereof, and the second polymer layer is applied so that it overlaps with the factory coating of the pipe units and bonds with the factory coating of the pipe units by the heat provided; and the heating is carried out by a moving carriage mounted on the pipe units.

2. The method according to claim 1, wherein the gel time of the epoxy powder is at least 30 s (ISO 8130-6).

3. The method according to claim 2, wherein the first temperature is above the melting point of the first polymer, and the epoxy powder melts and forms a layer on the pipe units after it is applied to the pipe units.

4. The method according to claim 3, wherein the first temperature is 1-20° C. above the melting point of the first polymer.

5. The method according to claim 2, wherein the gel time of the epoxy powder is 45-200 s (ISO 8130-6).

6. The method according to claim 1, wherein the second polymer is thermoplastic.

7. The method according to claim 6, wherein the second polymer is selected from a PE- (polyethylene) or PP- (polypropylene) based polyolefin.

8. The method according to claim 1, comprising applying the second polymer by melt film application technique.

9. The method according to claim 1, wherein the first temperature is less than 170° C., and the second temperature is higher than 170° C.

10. The method according to claim 9, wherein the first temperature is 110-170° C. and the second temperature is 170-200° C.

11. The method according to claim 10, wherein the first temperature is 140-160° C.

12. The method according to claim 1, wherein the second heating takes place 0.5 to 30 minutes later than the first heating.

13. The method according to claim 12, wherein the second heating takes place 0.5 to 5 minutes later than the first heating.

14. The method according to claim 1, comprising curing the first polymer finally only after application of the second polymer.

15. The method according to claim 1, wherein the second polymer forms a unitary layer, consisting of single polymer or a homogeneous blend of polymers.

16. The method according to claim 15, wherein the second polymer forms the topcoat layer of the coating.

17. The method according to claim 1, comprising preparing the region of the pipe units to be coated for the first polymer by grit blasting and subsequent dust removal, wherein the temperature of the pipe is kept at least 3° C. above dew temperature during blasting, heating the region to be coated to 110-160° C., spraying the powder epoxy to the heated region to form the reactive first polymer layer, heating the region to be coated to 170-190° C., applying the second polymer to the heated region in molten form and pressing the polymer towards the pipe units by leveling means.

18. The method according to claim 1, wherein one or both said polymer application steps are carried out by the carriage.

19. The method according to claim 18, wherein, when the carriage is used for both said polymer application steps, the carriage rotates around the periphery of the pipe units in one direction during application of the first polymer and rotates around the periphery of the pipe units to the other direction during application of the second polymer.

20. The method according to claim 1, wherein at the time of application of the second polymer, the glass transition temperature $T_g$ of the first polymer deviates by at least 3° C. from the literature value for the first polymer.

21. The method according to claim 1, further comprising allowing the pipe units with the reactive first polymer layer formed thereon to cool to a temperature below the first temperature.

22. The method according to claim 1, wherein the carriage rotates around the periphery of the pipe units.

23. A method for coating a field joint between two steel pipe units, comprising heating the pipe units to a first temperature;

after heating the pipe units to the first temperature, applying a curable first polymer onto the surface of the pipe units to coat the field joint between the pipe units;

partially curing the first polymer in order to form a reactive first polymer layer;

allowing the pipe units with the reactive first polymer layer formed thereon to cool to a temperature below the first temperature;

re-heating the cooled pipe units with the reactive first polymer layer formed thereon to a second temperature, the second temperature being higher than the first temperature; and after re-heating the pipe units to the second temperature, applying a second polymer directly onto the reactive first polymer layer, whereby the two polymers react and form a protective coating on the pipe units, wherein the first polymer comprises an epoxy powder, the second polymer is a reactive polyolefin, and the second polymer is applied by melt film application technique.

24. The method according to claim 23, wherein the second polymer is applied onto a polymeric coating on the surface of the pipe units.

* * * * *